(12) United States Patent
Satake et al.

(10) Patent No.: US 11,479,119 B2
(45) Date of Patent: Oct. 25, 2022

(54) VEHICLE

(71) Applicant: TOYOTA JIDOSHA KABUSHIKI KAISHA, Toyota (JP)

(72) Inventors: Shingo Satake, Toyota (JP); Yoshimitsu Yokouchi, Toyota (JP); Hiroki Saito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 195 days.

(21) Appl. No.: 17/062,619

(22) Filed: Oct. 4, 2020

(65) Prior Publication Data

US 2021/0101481 A1 Apr. 8, 2021

(30) Foreign Application Priority Data

Oct. 4, 2019 (JP) .............................. JP2019-183770

(51) Int. Cl.

| | |
|---|---|
| *B60W 10/14* | (2012.01) |
| *B60W 10/06* | (2006.01) |
| *B60W 10/02* | (2006.01) |
| *B60K 23/08* | (2006.01) |
| *B60K 17/34* | (2006.01) |
| *B60K 17/10* | (2006.01) |
| *B60W 30/20* | (2006.01) |
| *B60W 10/119* | (2012.01) |

(52) U.S. Cl.
CPC .......... *B60K 23/0808* (2013.01); *B60K 17/10* (2013.01); *B60W 10/026* (2013.01); *B60W 10/119* (2013.01); *B60W 30/20* (2013.01); *B60W 2030/206* (2013.01); *B60W 2510/0291* (2013.01); *B60W 2510/1005* (2013.01); *B60W 2520/10* (2013.01); *B60W 2520/28* (2013.01); *B60W 2710/027* (2013.01)

(58) Field of Classification Search
CPC ................ B60K 23/0808; B60K 17/10; B60K 17/3462; B60W 10/026; B60W 10/119; B60W 10/14; B60W 10/06; B60W 2510/0291; B60W 2510/1005; B60W 2520/10; B60W 2520/28; B60W 2710/027

See application file for complete search history.

(56) References Cited

U.S. PATENT DOCUMENTS

2018/0237003 A1\* 8/2018 Watanabe ............. B60W 10/14

FOREIGN PATENT DOCUMENTS

| JP | H06193727 A | 7/1994 |
|---|---|---|
| JP | 2008298145 A | 12/2008 |
| JP | 2011230613 A | 11/2011 |
| JP | 2015182693 A | 10/2015 |

\* cited by examiner

*Primary Examiner* — Tinh Dang
(74) *Attorney, Agent, or Firm* — Hunton Andrews Kurth LLP (57) ABSTRACT

The controller is programmed to perform first control that controls a driving force distributor such as to decrease a distribution rate upon satisfaction of a predetermined condition that a frequency of at least one rotation fluctuation of an output member of the drive system, a main drive wheel and a sub drive wheel is within a predetermined area, compared with the distribution rate upon non-satisfaction of the predetermined condition.

5 Claims, 5 Drawing Sheets

VEHICLE

CROSS-REFERENCE TO RELATED APPLICATIONS

The present disclosure claims priority to Japanese Patent Application No. 2019-183770 filed Oct. 4, 2019, which is incorporated herein by reference in its entirety including specification, drawings and claims.

TECHNICAL FIELD

The present disclosure relates to a vehicle.

BACKGROUND

In a vehicle equipped with a coupling provided to regulate distribution of a torque generated by a driving force source to front wheels serving as main drive wheels and to rear wheels serving as sub drive wheel, a proposed configuration determines that a torsional vibration (torsional vibration torque) is generated in a drive system including the rear wheels when a time rate of change in rotation angular velocity (acceleration) corresponding to a wheel speed of the rear wheels is equal to or larger than a reference value, and controls the coupling such that a transmission torque by the coupling becomes equal to a value obtained by adding a predetermined value to an estimated value of a road surface transmission torque of the rear wheels when the transmission torque is larger than this obtained value (as described in, for example, JP 2011-230613A). This vehicle performs such control to cause a necessary and sufficient torque to be transmitted to the rear wheels (i.e., to suppress an excessive increase in torque transmitted to the front wheels) and thereby suppress the occurrence of a slip in the front wheels.

SUMMARY

In the case here a surge vibration (a vibration in a vehicle longitudinal direction at a low frequency of several Hz to about 20 Hz) occurs in the vehicle, for example, accompanied with rotation of the front wheels or the rear wheels, the vehicle described above may not have a sufficiently large time rate of change in rotation angular velocity corresponding to the wheel speed of the rear wheels and may fail to suppress the surge vibration of the vehicle.

A main object of a vehicle according to the present disclosure is to suppress a surge vibration of the vehicle.

In order to achieve the above main object, the vehicle of the present disclosure employs the following configuration.

The present disclosure is directed to a vehicle. The vehicle includes a drive system, a driving force distributor configured to transmit a driving force from the drive system to a main drive wheel and a sub drive wheel and to regulate a distribution rate that is a ratio of a driving force transmitted between the drive system and the sub drive wheel to a total driving force transmitted between the drive system and the main drive wheel along with the sub drive wheel, and a controller programmed to control the drive system and the driving force distributor. The controller is programmed to perform first control that controls the driving force distributor such as to decrease the distribution rate upon satisfaction of a predetermined condition that a frequency of at least one rotation fluctuation of an output member of the drive system, the main drive wheel and the sub drive wheel is within a predetermined area, compared with the distribution rate upon non-satisfaction of the predetermined condition.

In the vehicle according to this aspect of the present disclosure, the controller is programmed to perform the first control that controls the driving force distributor such as to decrease the distribution rate upon satisfaction of the predetermined condition that the frequency of at least one rotation fluctuation of the output member of the drive system, the main drive wheel and the sub drive wheel is within the predetermined area, compared with the distribution rate upon non-satisfaction of the predetermined condition. The "predetermined area" used herein is a surge area where a surge vibration of the vehicle (a vibration in a vehicle longitudinal direction at a low frequency) is expected to occur. The configuration of using the frequency of at least one rotation fluctuation of the output member of the drive system, the main drive wheel and the sub drive wheel enables the occurrence of the surge vibration of the vehicle to be determined more appropriately, compared with a configuration of using a time rate of change in rotation angular velocity of such a component. The configuration of performing the first control upon satisfaction of the predetermined condition reduces the surge vibration of the vehicle caused by a rotation fluctuation of the sub drive wheel and thereby reduces the total surge vibration of the vehicle.

DESCRIPTION OF EMBODIMENTS

The following describes some aspects of the present disclosure with reference to embodiments.

First Embodiment

Figure 1:
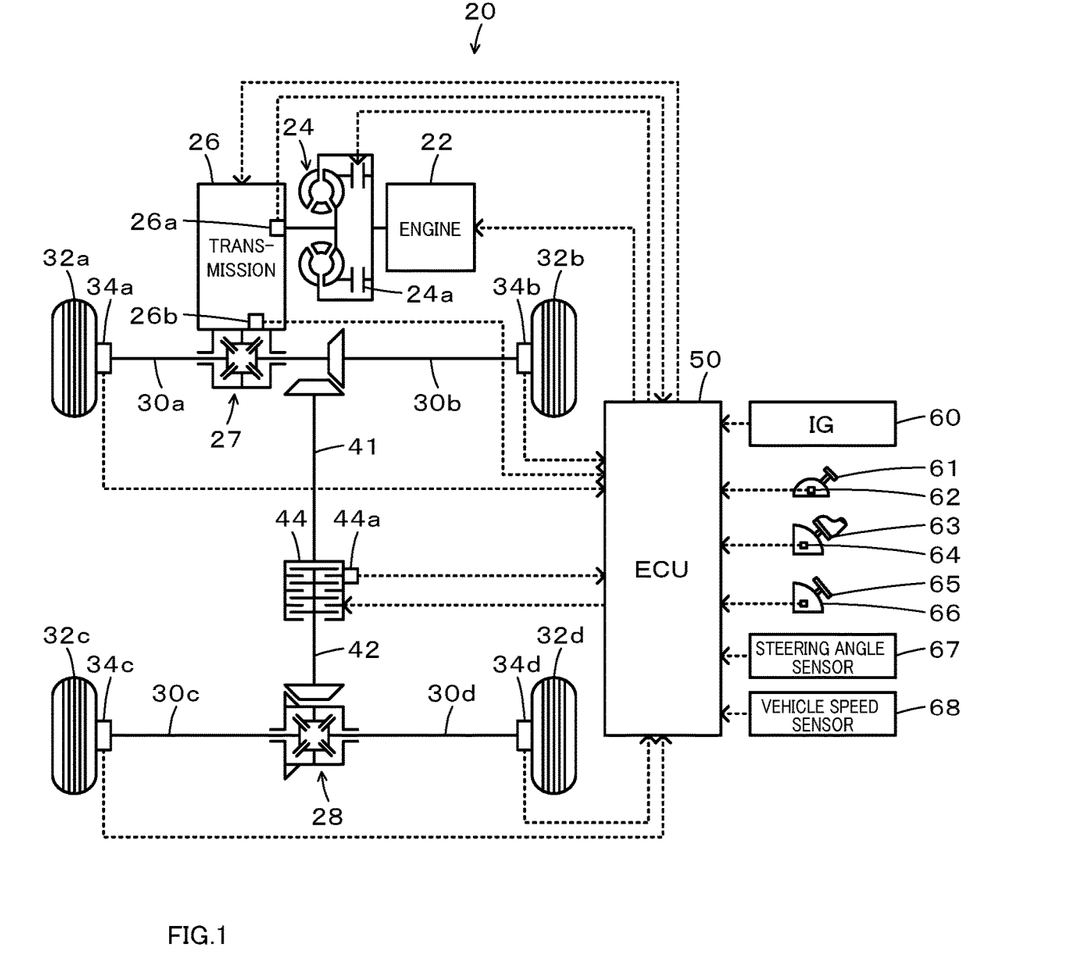
FIG. 1 is a configuration diagram illustrating the schematic configuration of a motor vehicle according to a first embodiment of the present disclosure.

FIG. 1 is a configuration diagram illustrating the schematic configuration of a motor vehicle according to a first embodiment of the present disclosure. As illustrated, the motor vehicle 20 of the first embodiment is configured as a front-wheel drive-based four-wheel drive vehicle with front wheels 32a and 32b serving as main drive wheels and rear wheels 32c and 32d serving as sub drive wheels. The motor vehicle 20 includes an engine 22, a fluid power transmission 24, a transmission (speed change gear) 26, a coupling (driving force distribution device) 44, and an electronic control unit (hereinafter referred to as "ECU") 50.

The engine 22 is configured as a four-cylinder, six-cylinder, eight-cylinder or another number of cylinder internal combustion engine to use, for example, gasoline or light oil as a fuel and output power through respective strokes of intake, compression, expansion (explosive combustion) and exhaust. The fluid power transmission 24 is configured as a torque converter having a torque amplifying function and includes a pump impeller, a turbine runner, a stator, a one-way clutch and a lockup clutch 24a.

The pump impeller is connected with a crankshaft of the engine 22 via a front cover. The turbine runner is connected with an input member of the transmission 26. The stator serves to rectify the flow of hydraulic oil from the turbine runner to the pump impeller. The one-way clutch serves to limit a rotating direction of the stator to one direction. The lockup clutch 24a serves to provide and release lockup that mechanically links the pump impeller (the engine 22) with the turbine runner (the input member of the transmission 26). The lockup clutch 24a may be configured as a hydraulically driven single disk friction clutch or may be configured as a hydraulically driven multiple disk friction clutch.

The transmission (speed change gear) 26 is configured as, for example, four-speed to ten-speed known transmission and includes an input member, an output member, a plurality of planetary gears, and a plurality of friction engagement elements (clutch and brake) although not being specifically illustrated. The input member is connected with the turbine runner. The output member is connected with the left and right front wheels (main drive wheels) 32a and 32b via axles 30a and 30b and a differential gear 27. This transmission 30 serves to selectively change the speed of the power transmitted from the engine 22 via the fluid power transmission 24 to its input member among multiple speeds and to output the power of the changed speed from its output member.

The coupling 44 is connected with a transmission shaft 41 that is linked with the axle 30b, and is also connected with a transmission shaft 42 that is linked with the left and right rear wheels (sub drive wheels) 32c and 32d via axles 30c and 30d and a differential gear 28. This coupling 44 is configured as a known electronically controlled coupling having an electromagnetic clutch. The electromagnetic clutch is configured, for example, as a multiple disk friction clutch to increase the engagement force with an increase in electric current applied to an electromagnetic coil (not shown).

The coupling 44 having the configuration described above serves to regulate the engagement force of the electromagnetic clutch and thereby regulate the transmission torque between the transmission shaft 41 and the transmission shaft 42. This regulates a rear wheel-side distribution rate Rr that is a ratio of the torque (driving force) transmitted between the output member of the transmission 26 and the rear wheels 32c and 32d to the total torque (total driving force) transmitted between the output member of the transmission 26 and the front wheels 32a and 32b along with the rear wheels 32c and 32d. According to the first embodiment, the coupling 44 is configured such as to regulate the rear wheel-side distribution rate Rr between for example, 0 and 0.4 or 0.5. The motor vehicle 20 is driven by two-wheel drive (2WD) when the rear wheel-side distribution rate Rr is equal to 0, while being driven by four-wheel drive (4WD) when the rear wheel-side distribution rate Rr is other than 0. Accordingly, the motor vehicle 20 is configured as a part-time 4WD vehicle.

The ECU 50 is configured as a CPU-based microprocessor and includes a ROM that stores processing programs, a RAM that temporarily stores data, input/output ports, in addition to the CPU, although not being specifically illustrated. Signals from various sensors are input into the ECU 50 via the input port. The signals input into the ECU 50 include signals from various sensors used to detect the conditions of the engine 22, for example, a crank angle θcr from a crank position sensor configured to detect the rotational position of a crankshaft of the engine 22. The input signals also include a rotation speed Nin of the input member from a rotation speed sensor 26a mounted to the input member of the transmission 26 and a rotation speed Nout of the output member from a rotation speed sensor 26b mounted to the output member of the transmission 26. The input signals further include rotation speeds Nwa to Nwd of the front wheels 32a and 32b and the rear wheels 32c and 32d from rotation speed sensors 34a to 34d respectively mounted to the front wheels 32a and 32b and to the rear wheels 32c and 32d and a temperature Tc of the coupling 44 from a temperature sensor 44a mounted to the coupling 44. The input signals also include an ignition signal from an ignition switch 60, a shift position SP from a shift position sensor 62 configured to detect an operating position of a shift lever 61, an accelerator position Acc from an accelerator pedal position sensor 64 configured to detect a depression amount of an accelerator pedal 63, and a brake pedal position BP from a brake pedal position sensor 66 configured to detect a depression amount of a brake pedal 65. The input signals further include a steering angle θs from a steering angle sensor 67 configured to detect a steering angle of a non-illustrated steering wheel and a vehicle speed V from a vehicle speed sensor 68.

A variety of controls signals are output from the ECU 50 via the output port. The signals output from the ECU 50 include, for example, control signals to the engine 22, to the transmission 26 and to the coupling 44. The ECU 50 calculates a rotation speed Ne of the engine 22, based on the crank angle θcr input from the crank position sensor.

In the motor vehicle 20 of the first embodiment having the configuration described above, the ECU 50 basically performs basic drive control described below. The basic drive control controls the engine 22, the lockup clutch 24a of the fluid power transmission 24, the transmission (speed change gear) 26, the coupling 44 and the like, such that the motor vehicle 20 is driven with the good energy efficiency and the good attitude stability in response to the driver's accelerator operation.

Figure 2:
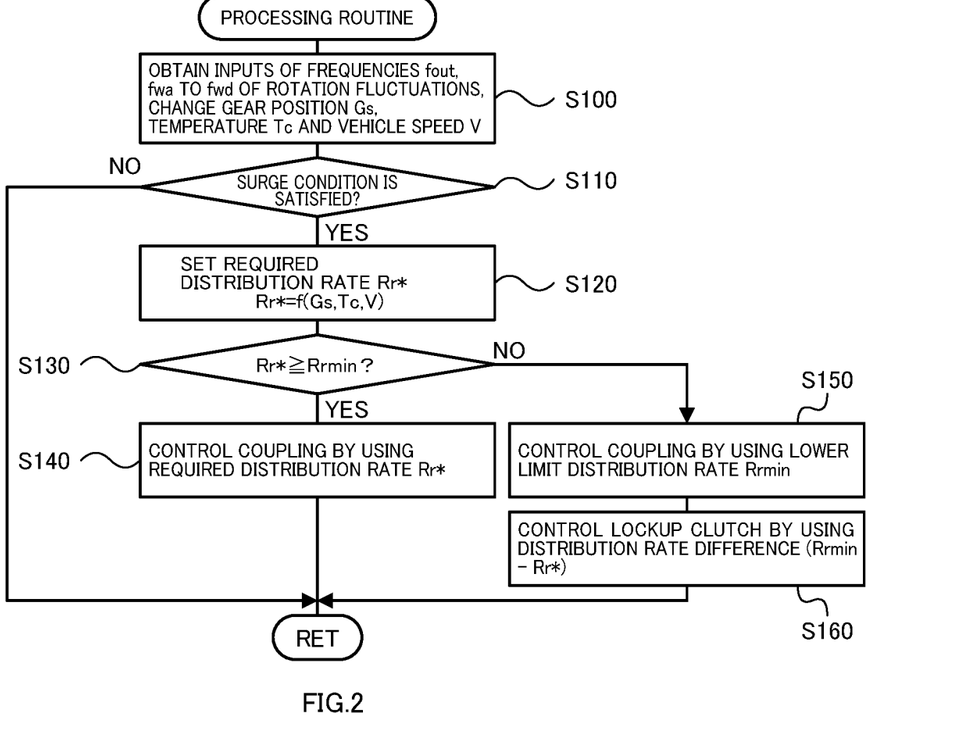
FIG. 2 is a chart showing one example of a processing routine performed by an ECU according to the first embodiment.

The following describes operations of the motor vehicle 20 of the first embodiment configured as described above. FIG. 2 is a chart showing one example of a processing routine performed by the ECU 50. This routine is performed repeatedly.

When the processing routine of FIG. 2 is triggered, the ECU 50 first obtains input data, such as frequencies fwa to fwd of rotation fluctuations of the front wheels 32a and 32b and the rear wheels 32c and 32d, a frequency fout of a rotation fluctuation of the output member of the transmission 26, a change gear position Gs of the transmission (speed change gear) 26, the temperature Tc of the coupling 44 and the vehicle speed V (step S100). The frequencies fwa to fwd of the rotation fluctuations of the front wheels 32a and 32b and the rear wheels 32c and 32d input here are values calculated from the rotation speeds Nwa to Nwd of the front wheels 32a and 32b and the rear wheels 32c and 32d detected by the rotation speed sensors 34a to 34d. The frequency fout of the rotation fluctuation of the output member of the transmission 26 input here is a value calculated from the rotation speed Nout of the output member of the transmission 26 detected by the rotation speed sensor 26b. The change gear position Gs of the transmission 26 input here is, for example, a change gear position corresponding to a currently engaged element out of the plurality of friction engagement elements or a change gear position corresponding to a change gear ratio that is obtained by dividing the rotation speed Nin of the input member of the transmission 26 by the rotation speed Nout of the output member. The temperature Tc of the coupling 44 input here is a value detected by the temperature sensor 44a. The vehicle speed V input here is a value detected by the vehicle speed sensor 68.

After obtaining the input data, the ECU 50 determines whether a surge condition is satisfied or not satisfied by using the frequencies fwa to fwd of the rotation fluctuations of the front wheels 32a and 32b and the rear wheels 32c and 32d and the frequency fout of the rotation fluctuation of the output member of the transmission 26 (step S110). The surge condition herein denotes a condition expected to cause a surge vibration of the vehicle accompanied with operation of the engine 22 or rotation of the front wheels 32a and 32b and the rear wheels 32c and 32d. The surge vibration of the vehicle is a vibration in a vehicle longitudinal direction at a low frequency of several Hz to about 20 Hz and is a vibration which the driver is likely to feel. The following describes the details of the surge vibration of the vehicle.

Figure 3:
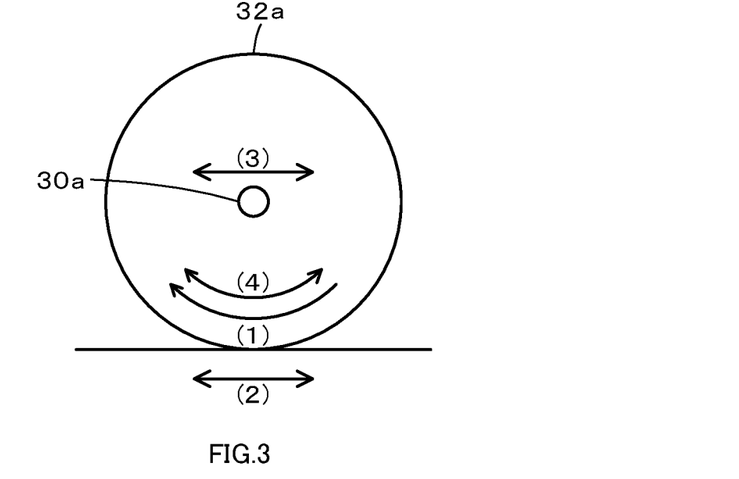
FIG. 3 is a diagram illustrating rotations of an axle and a front wheel.

FIG. 3 is a diagram illustrating rotations of an axle and a front wheel. In general, an outer circumference of the front wheel 32a is not a perfect circle but has slight irregularities or slight concaves and convexes. It is accordingly assumed that the front wheel 32a has an unbalanced point at one position on the outer circumference. In this case, when the axle 30a and the front wheel 32a are rotated (as shown by (1) in FIG. 3), a force from the road surface causes a force in the vehicle longitudinal direction to be applied to the front wheel 32a and the axle 30a (as shown by (2) and (3) in FIG. 3) in the course of one rotation of the axle 30a and the front wheel 32a. This causes rotation fluctuations of the axle 30a and the front wheel 32a (so-called primary rotation fluctuation as shown by (4) in FIG. 3). The axles 30b to 30d and the front wheel 32b and the rear wheels 32c and 32d are also expected to have rotation fluctuations like the axle 30a and the front wheel 32a. The engine 22 outputs power by periodical explosive combustion. Accordingly, the engine 22, the fluid power transmission 24 (the lockup clutch 24a) and the transmission 26 have rotation fluctuations. Furthermore, the engine 22 and the transmission 26 are fixed to a non-illustrated vehicle body via respective mounts, and the axles 30a to 30d are linked with the vehicle body via suspensions. The rotation fluctuations arising in the engine 22, the transmission 26, the axles 30a to 30d and the like are thus likely to be transmitted to the vehicle body in the form of vibrations. Based on the foregoing, the vehicle is expected to have the surge vibration when the frequency of the rotation fluctuation of the output member of the transmission 26 and the frequencies of the rotation fluctuations of the axles 30a to 30d and the front wheels 32a and 32b and the rear wheels 32c and 32d are included in a surge area (low frequency area of, for example, several Hz to about 20 Hz). When the engine 22 used is a four-cylinder engine, a six-cylinder engine, an eighth-cylinder engine or the like, the frequency of explosive combustion in the engine 22 is 33 Hz, 50 Hz, 66 Hz or the like at a rotation speed of the engine 22 equal to 1000 rpm. When the engine 22 is operated basically at a rotation speed of higher than 1000 rpm during drive of the vehicle, the frequency of the rotation fluctuation of the engine 22 is less likely to be included in the surge area.

By taking into account the foregoing, according to the first embodiment, the ECU 50 determines that the surge condition is satisfied when at least one of the frequencies fwa to fwd of the rotation fluctuations of the front wheels 32a and 32b and the rear wheels 32c and 32d and the frequency fout of the rotation fluctuation of the output member of the transmission 26 is included in the surge area (for example several Hz to about 20 Hz), while determining that the surge condition is not satisfied when all of the frequencies fwa to fwd of the rotation fluctuations of the front wheels 32a and 32b and the rear wheels 32c and 32d and the frequency fout of the rotation fluctuation of the output member of the transmission 26 are out of the surge area. When it is determined at step S110 that the surge condition is not satisfied, the ECU 50 terminates this routine. In this case, the ECU 50 performs the basic drive control described above.

When it is determined at step S110 that the surge condition is satisfied, on the other hand, the ECU 50 sets a required distribution rate Rr* that is a required value of the rear wheel-side distribution rate Rr by using the change gear position Gs of the transmission 26, the temperature Tc of the coupling 44, the vehicle speed V and a required distribution rate setting map (step S120). The required distribution rate setting map is specified in advance as a relationship of the change gear position Gs of the transmission 26, the temperature Tc of the coupling 44 and the vehicle speed V to the required distribution rate Rr* such as to reduce the surge vibration of the vehicle and is stored in the non-illustrated ROM. The required distribution rate Rr* in this case is set to a smaller value than a value set in the case of non-satisfaction of the surge condition.

When obtaining the required distribution rate Rr*, the ECU 50 compares the required distribution rate Rr* with a lower limit distribution rate Rrmin that is a lower limit value of the rear wheel-side distribution rate Rr (step S130). The lower limit distribution rate Rrmin may be set by taking into account the viewpoints of, for example, a function guaranteed temperature of the coupling 44 and NV (noise and vibration) of the vehicle or may be a fixed value.

When the required distribution rate Rr* is equal to or larger than the lower limit distribution rate Rrmin at step S130, the ECU 50 controls the coupling 44 by using the required distribution rate Rr* (step S140) and then terminates this routine. A procedure of controlling the coupling 44 in this case, for example, sets a required engagement force Fc* of the electromagnetic clutch of the coupling 44 such as to decrease with a decrease in the required distribution rate Rr* and controls the electromagnetic clutch such that the engagement force of the electromagnetic clutch becomes equal to the required engagement force Fc*.

Such control reduces the engagement force of the electromagnetic clutch of the coupling 44 and decreases the transmission torque of the coupling 44 (the rear wheel-side distribution rate Rr), compared with the transmission torque in the case of non-satisfaction of the surge condition. This reduces the surge vibration that is caused by the rotation fluctuation of the engine 22 and that is transmitted to the vehicle body via the fluid power transmission 24, the transmission 26, the differential gear 27, the axle 30b, the coupling 44, the axles 30c and 30d and the like, as well as the surge vibration that is caused by the rotation fluctuations of the rear wheels 32c and 32d and that is transmitted to the vehicle body via the axles 30c and 30d, the coupling 44, the axle 30b and the like. As a result, this control reduces the total surge vibration of the vehicle. When the surge condition becomes not satisfied at step S110 in a subsequent cycle of this routine, the ECU 50 returns the control to the basic drive control described above.

When the required distribution rate Rr* is smaller than the lower limit distribution rate Rrmin at step S130, on the other hand, the ECU 50 controls the coupling 44 by using the lower limit distribution rate Rrmin (step S150), controls the lockup clutch 24a by using a distribution rate difference (Rrmin−Rr*) that is obtained by subtracting the required distribution rate Rr* from the lower limit distribution rate Rrmin (step S160) and then terminates this routine. A procedure of controlling the coupling 44 in this case is similar to the procedure of the processing of step S140, except that the lower limit distribution rate Rrmin is used in place of the required distribution rate Rr*. A procedure of controlling the lockup clutch 24a in this case, for example, sets a target slip velocity Ns* such as to increase with an increase in the distribution rate difference (Rrmin−Rr*) and controls the lockup clutch 24a such that a slip velocity Ns(=Ne−Nin) becomes equal to the target slip velocity Ns*.

Such control reduces the engagement force of the lockup clutch 24a and decreases the transmission torque of the lockup clutch 24a, in addition to decreasing the transmission torque of the coupling 44 (the rear wheel-side distribution rate Rr), compared with the transmission torques in the case of non-satisfaction of the surge condition. This reduces the surge vibration that is caused by the rotation fluctuation of the engine 22 and that is transmitted to the vehicle body via the fluid power transmission 24, the transmission 26 and the like and more effectively reduces the total surge vibration of the vehicle. When the surge condition becomes not satisfied at step S110 in a subsequent cycle of this routine, the ECU 50 returns the control to the basic drive control described above.

As described above, the motor vehicle 20 of the first embodiment determines that the surge condition is satisfied when at least one of the frequencies fwa to fwd of the rotation fluctuations of the front wheels 32a and 32b and the rear wheels 32c and 32d and the frequency fout of the rotation fluctuation of the output member of the transmission 26 is included in the surge area. This enables the occurrence of the surge vibration of the vehicle to be determined more appropriately. The motor vehicle 20 of the first embodiment decreases the transmission torque of the coupling 44 (the rear wheel-side distribution rate Rr) in the case of satisfaction of the surge condition, compared with the transmission torque in the case of non-satisfaction of the surge condition. This reduces the total surge vibration of the vehicle.

Furthermore, when the surge condition is satisfied and the required distribution rate Rr* is smaller than the lower limit rate Rrmin, the motor vehicle 20 of the first embodiment decreases the transmission torque of the lockup clutch 24a, in addition to decreasing the transmission torque of the coupling (the rear wheel-side distribution rate Rr). This more effectively reduces the total surge vibration of the vehicle.

When the surge condition is satisfied and the required distribution rate Rr* is equal to or larger than the lower limit distribution rate Rrmin, the motor vehicle 20 of the first embodiment decreases the transmission torque of the coupling 44. A modification may decrease the transmission torque of the lockup clutch 24a, in addition to decreasing the transmission torque of the coupling 44.

When the surge condition is satisfied and the required distribution rate Rr* is smaller than the lower limit rate Rrmin, the motor vehicle 20 of the first embodiment decreases the transmission torque of the lockup clutch 24a, in addition to decreasing the transmission torque of the coupling 44. A modification may not decrease the transmission torque of the lockup clutch 24a, while decreasing the transmission torque of the coupling 44 in an allowable range.

Second Embodiment

Figure 4:
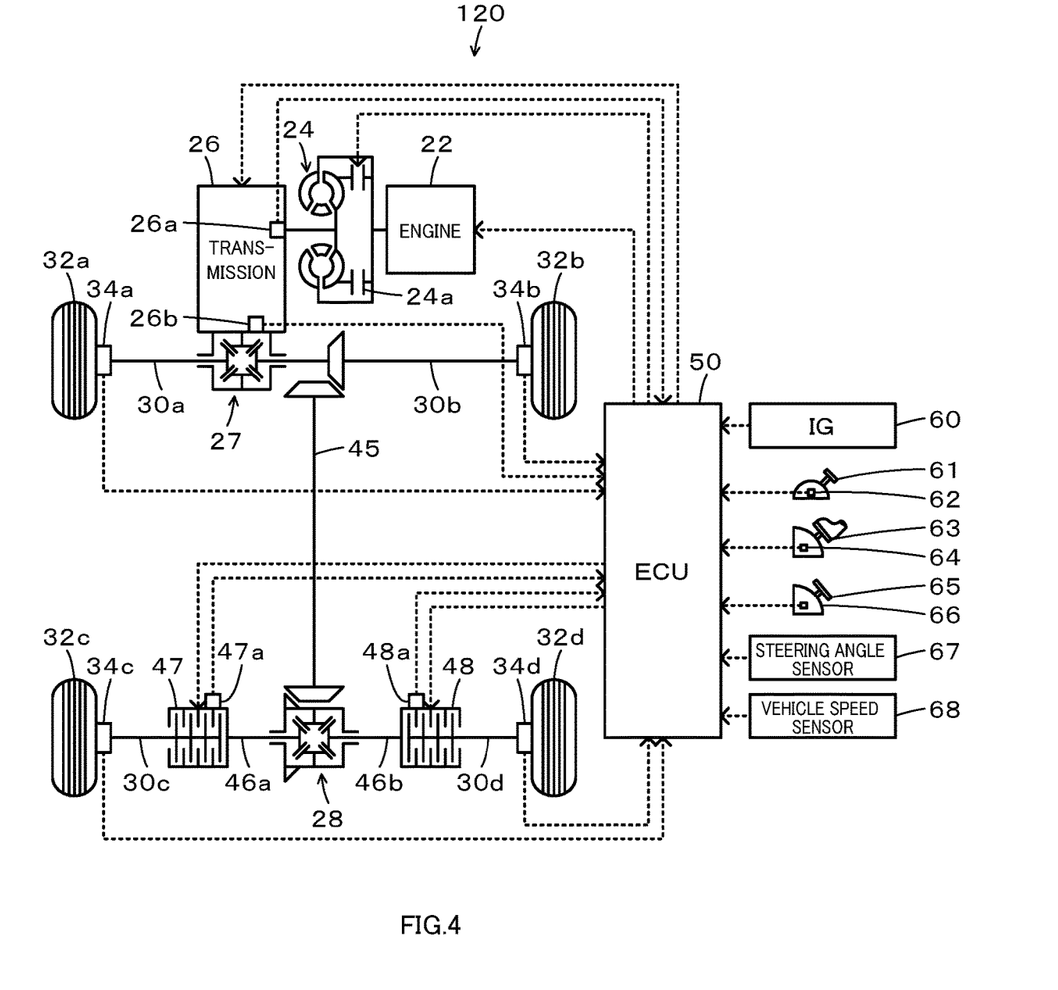
FIG. 4 is a configuration diagram illustrating the schematic configuration of a motor vehicle according to a second embodiment of the present disclosure.

FIG. 4 is a configuration diagram illustrating the schematic configuration of a motor vehicle according to a second embodiment of the present disclosure. The motor vehicle 120 of the second embodiment differs from the motor vehicle 20 of the first embodiment by transmission shafts 45, 46a and 46b and couplings 47 and 48 provided in place of the transmission shafts 41 and 42 and the coupling 44. Like components of the hardware configuration of the motor vehicle 120 of the second embodiment to those of the motor vehicle 20 of the first embodiment are expressed by like reference signs, and their detailed description is omitted.

In the motor vehicle 120 of the second embodiment, the axle 30b is linked with the differential gear 28 via the transmission shaft 45. The couplings 47 and 48 are configured similarly to the coupling 44. The coupling 47 is connected with the axle 30c and with the transmission shaft 46a that is linked with the differential gear 28. The coupling 47 serves to regulate the engagement force of the electromagnetic clutch and thereby regulate the transmission torque between the transmission shaft 46a and the axle 30c. The coupling 48 is connected with the axle 30d and with the transmission shaft 46b that is linked with the differential gear 28. The coupling 48 serves to regulate the engagement force of the electromagnetic clutch and thereby regulate the transmission torque between the transmission shaft 46b and the axle 30d. This regulates the rear wheel-side distribution rate Rr and also regulates a left-side distribution rate R2 that is a ratio of the torque (driving force) transmitted between the rear wheel 32c and the transmission shaft 45 along with the differential gear 28 to the total torque (total driving force) transmitted between the rear wheels 32c and 32d and the transmission shaft 45 along with the differential gear 28.

Figure 5:
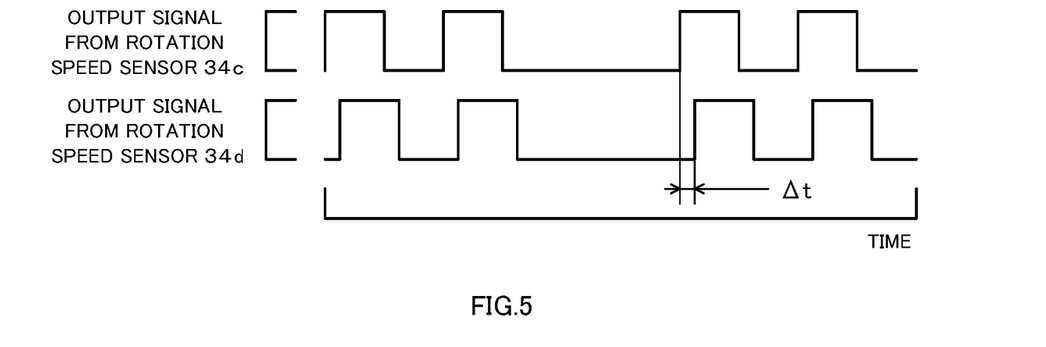
FIG. 5 is a diagram illustrating one example of output signals from rotation speed sensors.

In place of the temperature Tc of the coupling 44 from the temperature sensor 44a, temperatures Tca and Tcb of the couplings 47 and 48 from temperature sensors 47a and 47b respectively mounted to the couplings 47 and 48 are input into the ECU 50. According to the second embodiment, the rotation speed sensors 34a to 34d are configured as, for example, electromagnetic pickup sensors and respectively include a magnetic rotor mounted to each of the axles 30a to 30d and a detector. The magnetic rotor has one missing tooth for detection of a reference position out of a plurality of teeth formed at predetermined intervals. The detector outputs a rectangular wave every time a tooth passes through during rotation of the magnetic rotor. FIG. 5 is a diagram illustrating one example of output signals from rotation speed sensors. In this case, the ECU 50 calculates rotation speeds Nwa to Nwd of the front wheels 32a and 32b and the rear wheels 32c and 32d, based on the signals from the rotation speed sensors 34a to 34d. The ECU 50 also estimates a phase shift of rotation fluctuations of the left and right rear wheels 32c and 32d, for example, based on a time difference Δt (shown in FIG. 5) between rises immediately after the missing tooth in the signals from the rotation speed sensors 34c and 34d (i.e., rises having a time period from a previous rise to a current rise (pulse time Tp) almost twice the other pulse times Tp).

In the motor vehicle 120 of the second embodiment having the configuration described above, the ECU 50 basically performs basic drive control described below. The basic drive control controls the engine 22, the lockup clutch 24a of the fluid power transmission 24, the transmission (speed change gear) 26, the couplings 47 and 48 and the like, such that the motor vehicle 120 is driven with the good energy efficiency and the good attitude stability in response to the driver's accelerator operation.

Figure 6:
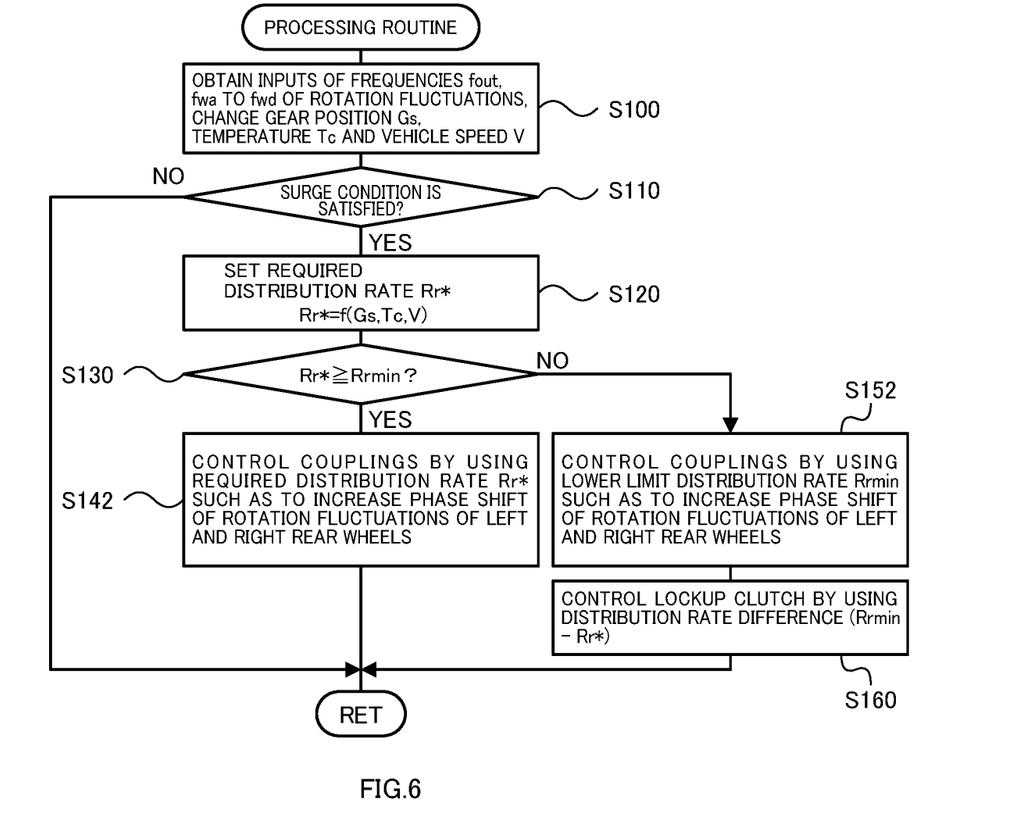
FIG. 6 is a chart showing one example of a processing routine performed by the ECU according to the second embodiment.

The following describes operations of the motor vehicle 120 of the second embodiment configured as described above. FIG. 6 is a chart showing one example of a processing routine performed by the ECU according to the second embodiment. This routine is performed repeatedly. The processing routine of FIG. 6 differs from the processing routine of FIG. 2 by replacement of the processing of steps S140 and A150 with the processing of steps S142 and S152. Like processing steps in the processing routine of FIG. 6 to those in the processing routine of FIG. 2 are expressed by like step numbers, and their detailed description is omitted.

In the processing routine of FIG. 6, when the required distribution rate Rr* is equal to or larger than the lower limit distribution rate Rrmin at step S130, the ECU 50 controls the couplings 47 and 48 by using the required distribution rate Rr* such as to increase a phase shift of the rotation fluctuations of the left and right rear wheels 32c and 32d (step S142) and then terminates this routine. A procedure of controlling the couplings 47 and 48 in this case, for example, sets required engagement forces Fca* and Fcb* of the electromagnetic clutches of the couplings 47 and 48 such as to decrease with a decrease in the required distribution rate Rr* and such as to increase the phase shift of the rotation fluctuations of the left and right rear wheels 32c and 32d and controls the electromagnetic clutches such that the engagement forces of the electromagnetic clutches become equal to the required engagement forces Fca* and Fcb*.

When the required distribution rate Rr* is smaller than the lower limit distribution rate Rrmin at step S130, on the other hand, the ECU 50 controls the couplings 47 and 48 by using the lower limit distribution rate Rrmin such as to increase a phase shift of the rotation fluctuations of the left and right rear wheels 32c and 32d (step S152), controls the lockup clutch 24a by using the distribution rate difference (Rrmin−Rr*) that is obtained by subtracting the required distribution rate Rr* from the lower limit distribution rate Rrmin (step S160) and then terminates this routine. A procedure of controlling the couplings 47 and 48 in this case is similar to the procedure of the processing of step S142, except that the lower limit distribution rate Rrmin is used in place of the required distribution rate Rr*.

Figure 7:
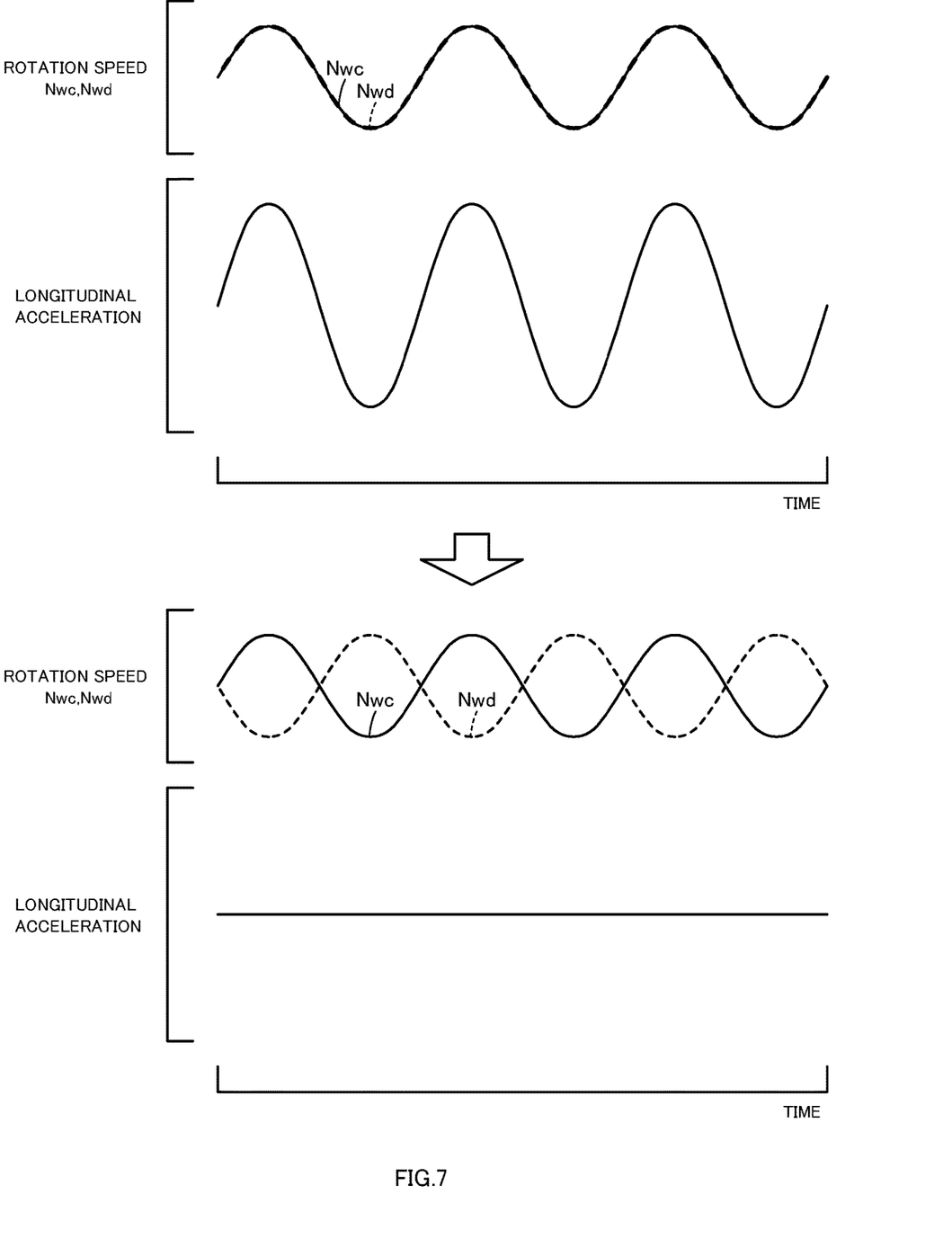
FIG. 7 is a diagram illustrating one example of rotation fluctuations of left and right rear wheels and a variation in acceleration in a vehicle longitudinal direction occurring in the vehicle due to the rotation fluctuations.

FIG. 7 is a diagram illustrating one example of rotation fluctuations of left and right rear wheels and a variation in acceleration in a vehicle longitudinal direction occurring in the vehicle due to the rotation fluctuations. As shown in the upper graph of FIG. 7, when the rotation fluctuations of the left and right rear wheels 32c and 32d have an identical phase, this increases a fluctuation in acceleration in the vehicle longitudinal direction generated in the vehicle due to the rotational fluctuations of the left and right rear wheels 32c and 32d. As shown in the lower graph of FIG. 7, on the other hand, when the rotation fluctuations of the left and right rear wheels 32c and 32d have a large phase shift or preferably a shift of 180 degrees, this decreases a fluctuation in acceleration in the vehicle longitudinal direction generated in the vehicle due to the rotational fluctuations of the left and right rear wheels 32c and 32d. Accordingly, in the case of satisfaction of the surge condition, the control regulates the engagement forces of the electromagnetic clutches of the couplings 47 and 48 to increase the phase shift of the rotational fluctuations of the left and right rear wheels 32c and 32d, in addition to reducing the engagement forces of the electromagnetic clutches to decrease the transmission torques of the couplings 47 and 48 (the rear wheel-side distribution rate Rr), compared with the phase shift and the transmission torques in the case of non-satisfaction of the surge condition. This control more effectively reduces the total surge vibration of the vehicle.

The motor vehicle 120 of the second embodiment described above determines whether the surge condition is satisfied or not satisfied by the same technique as the technique employed in the motor vehicle 20 of the first embodiment. This enables the occurrence of the surge vibration of the vehicle to be determined more appropriately. The motor vehicle 120 of the second embodiment regulates the engagement forces of the electromagnetic clutches of the couplings 47 and 48 to increase the phase shift of the rotational fluctuations of the left and right rear wheels 32c and 32d, in addition to reducing the engagement forces of the electromagnetic clutches to decrease the transmission torques of the couplings 47 and 48 (the rear wheel-side distribution rate Rr) in the case of satisfaction of the surge condition, compared with the phase shift and the transmission torques in the case of non-satisfaction of the surge condition. This more effectively reduces the total surge vibration of the vehicle.

The motor vehicle 120 of the second embodiment regulates the engagement forces of the electromagnetic clutches of the couplings 47 and 48 to increase the phase shift of the rotational fluctuations of the left and right rear wheels 32c and 32d, in addition to reducing the engagement forces of the electromagnetic clutches to decrease the transmission torques of the couplings 47 and 48 (the rear wheel-side distribution rate Rr) in the case of satisfaction of the surge condition, compared with the phase shift and the transmission torques in the case of non-satisfaction of the surge condition. A modification may not increase (but may keep unchanged) the phase shift of the rotation fluctuations of the left and right rear wheels 32c and 32d, while decreasing the transmission torques of the couplings 47 and 48, in the case of satisfaction of the surge condition, compared with the phase shift and the transmission torques in the case of non-satisfaction of the surge condition.

When the surge condition is satisfied and the required distribution rate Rr* is equal to or larger than the lower limit distribution rate Rrmin, the motor vehicle 120 of the second embodiment decreases the transmission torques of the couplings 47 and 48. A modification may decrease the transmission torque of the lockup clutch 24a, in addition to decreasing the transmission torques of the couplings 47 and 48.

When the surge condition is satisfied and the required distribution rate Rr* is smaller than the lower limit rate Rrmin, the motor vehicle 120 of the second embodiment decreases the transmission torque of the lockup clutch 24a, in addition to decreasing the transmission torques of the couplings 47 and 48. A modification may not decrease the transmission torque of the lockup clutch 24a, while decreasing the transmission torques of the couplings 47 and 48 in an allowable range.

In the motor vehicle 20 of the first embodiment or in the motor vehicle 120 of the second embodiment, when the surge condition is satisfied, the required distribution rate Rr* of the electromagnetic clutch of the coupling 44 or the required distribution rate Rr* of the electromagnetic clutches of the couplings 47 and 48 is set by using the change gear position Gs of the transmission 26, the temperature Tc of the coupling 44 or the temperatures Tca and Tcb of the couplings 47 and 48, and the vehicle speed V. A modification may set the required distribution rate Rr* by using only part of the change gear position Gs of the transmission 26, the temperature Tc of the coupling 44 or the temperatures Tca and Tcb of the couplings 47 and 48, and the vehicle speed V. Another modification may use a fixed value in a narrower range as the required distribution rate Rr* in the case of satisfaction of the surge condition, compared with a range in the case of non-satisfaction of the surge condition.

In the motor vehicle 20 of the first embodiment or in the motor vehicle 120 of the second embodiment, the coupling 44 or the couplings 47 and 48 are configured as the known electronically controlled couplings having the electromagnetic clutches. According to a modification, however, the coupling 44 or the couplings 47 and 48 may be configured as couplings having hydraulically driven clutches or may be configured as couplings having electromagnetic clutches and hydraulically driven clutches.

The motor vehicle 20 of the first embodiment or the motor vehicle 120 of the second embodiment is configured as a general automobile that is driven with only the power from the engine 22. According to a modification, however, the motor vehicle 20 or the motor vehicle 120 may be configured as a series hybrid vehicle or a parallel hybrid vehicle that is equipped with a motor for driving in addition to the engine 22. According to another modification, the motor vehicle 20 or the motor vehicle 120 may be configured as an electric vehicle that is not equipped with an engine and that is driven with only the power from a motor.

The motor vehicle 20 of the first embodiment or the motor vehicle 120 of the second embodiment is configured as the part-time four-wheel drive vehicle. According to a modification, however, the motor vehicle 20 or the motor vehicle 120 may be configured as a full-time four-wheel drive vehicle.

The motor vehicle 20 of the first embodiment or the motor vehicle 120 of the second embodiment is configured as the front-wheel drive-based four-wheel drive vehicle with the front wheels 32a and 32b serving as the main drive wheels and the rear wheels 32c and 32d serving as the sub drive wheels. According to a modification, however, the motor vehicle 20 or the motor vehicle 120 may be configured as a rear-wheel drive-based four-wheel drive vehicle with the rear wheels 32c and 32d serving as the main drive wheels and the front wheels 32a and 32b serving as the sub drive wheels.

In this vehicle of the present disclosure, the drive system may comprise an engine, a fluid power transmission that is connected with the engine and that includes a lockup clutch, and a transmission that is connected with the fluid power transmission and with the output member, and upon satisfaction of the predetermined condition, the controller may be programmed to perform second control that controls the lockup clutch such as to decrease an engagement force of the lockup clutch, in addition to the first control. In the vehicle of this aspect, upon satisfaction of the predetermined condition, when a target distribution rate based on at least one of a vehicle speed, a change gear position of the transmission and a temperature of the driving force distributor is equal to or larger than a reference value, the controller may control the driving force distributor such that the distribution rate becomes equal to the target distribution rate, as the first control, while not performing the second control. Upon satisfaction of the predetermined condition, when the target distribution rate is smaller than the reference value, the controller may control the driving force distributor such that the distribution rate becomes equal to the reference value, as the first control, while controlling the lockup clutch such as to decrease the engagement force of the lockup clutch with an increase in difference between the reference value and the target distribution rate, as the second control. This configuration more effectively reduces the total surge vibration of the vehicle.

In this vehicle of the present disclosure, the driving force distributor may have a coupling mounted between a main-side transmission shaft that is linked with the output member and the main drive wheel via a main-side differential gear and a sub-side transmission shaft that is linked with the sub drive wheel via a sub-side differential gear.

In this vehicle of the present disclosure, the driving force distributor may have a pair of couplings mounted between a pair of the sub drive wheels and a sub-side differential gear that is connected with the output member and with a pair of the main drive wheels via a transmission shaft. Upon satisfaction of the predetermined condition, the controller may be programmed to control the pair of couplings such as to decrease the distribution rate and such as to increase a phase shift of rotation fluctuations of the pair of sub drive wheels, as the first control, compared with the distribution rate and the phase shift upon non-satisfaction of the predetermined condition. This configuration more effectively reduces the total surge vibration of the vehicle.

The following describes a correspondence relationship between the primary components of the embodiments described above and the primary components in the respective aspects of the present disclosure described in Summary. According to the first embodiment, the engine 22, the fluid power transmission 24 and the transmission 26 correspond to the "drive system", the coupling 44 corresponds to the "driving force distributor", and the ECU 50 corresponds to the "controller". According to the second embodiment, the engine 22, the fluid power transmission 24 and the transmission 26 correspond to the "drive system", the couplings 47 and 48 correspond to the "driving force distributor", and the ECU 50 corresponds to the "controller".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is applicable to the manufacturing industries of the vehicle and so on.

What is claimed is:
1. A vehicle, comprising:
a drive system;
a driving force distributor configured to transmit a driving force from the drive system to a main drive wheel and a sub drive wheel and to regulate a distribution rate that is a ratio of a driving force transmitted between the drive system and the sub drive wheel to a total driving force transmitted between the drive system and the main drive wheel along with the sub drive wheel; and a controller programmed to control the drive system and the driving force distributor, wherein the controller is programmed to perform first control that controls the driving force distributor such that to decrease the distribution rate upon satisfaction of a predetermined condition, compared with the distribution rate upon non-satisfaction of the predetermined condition, wherein the predetermined condition is a condition that a frequency of at least one rotation fluctuation of i) an output member of the drive system, ii) the main drive wheel and iii) the sub drive wheel, is within a predetermined area.

2. The vehicle according to claim 1, wherein the drive system comprises an engine, a fluid power transmission that is connected with the engine and that includes a lockup clutch, and a transmission that is connected with the fluid power transmission and with the output member, and wherein upon satisfaction of the predetermined condition, the controller is programmed to perform second control that controls the lockup clutch such as to decrease an engagement force of the lockup clutch, in addition to the first control.

3. The vehicle according to claim 2, wherein, upon satisfaction of the predetermined condition, when a target distribution rate based on at least one of a vehicle speed, a change gear position of the transmission and a temperature of the driving force distributor is equal to or larger than a reference value, the controller is programmed to control the driving force distributor such that the distribution rate becomes equal to the target distribution rate, as the first control, while not performing the second control, and when the target distribution rate is smaller than the reference value, the controller is programmed to control the driving force distributor such that the distribution rate becomes equal to the reference value, as the first control, while controlling the lockup clutch such that to decrease the engagement force of the lockup clutch with an increase in difference between the reference value and the target distribution rate, as the second control.

4. The vehicle according to claim 1, wherein the driving force distributor has a coupling mounted between a main-side transmission shaft that is linked with the output member and the main drive wheel via a main-side differential gear and a sub-side transmission shaft that is linked with the sub drive wheel via a sub-side differential gear.

5. The vehicle according to claim 1, wherein the driving force distributor has a pair of couplings mounted between a pair of the sub drive wheels and a sub-side differential gear that is connected with the output member and with a pair of the main drive wheels via a transmission shaft, and wherein upon satisfaction of the predetermined condition, the controller is programmed to control the pair of couplings such as to decrease the distribution rate and such that to increase a phase shift of rotation fluctuations of the pair of sub drive wheels, as the first control, compared with the distribution rate and the phase shift upon non-satisfaction of the predetermined condition.

* * * * *